DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 18

T870,007

PHOTOGRAPHIC ELEMENT AND A ONE-STEP DEVELOPMENT PROCESS USING WATER

Francois Bredoux, Kodak-Pathé 30, Vincennes, France, and Maurice Pfaff, Rue des Vignerons 94, Le Perreux, France

Filed Sept. 3, 1969, Ser. No. 855,034

Claims priority, application France, Nov. 13, 1968, 173,417

Int. Cl. G03c *5/38, 1/06, 1/48*

U.S. Cl. 96—61

No Drawing. 22 Pages Specification

A photographic element comprising a support, a photographic silver halide emulsion, a developing agent, a fixing agent or stabilizing agent and a binder, which is suitable for processing, in one step, with water alone includes applying the fixing agent or stabilizing agent to the element in a non-aqueous coating composition containing an organic binder. The photographic element can contain an alkaline development activator, such as an alkali metal borate or a 4-aminopyridine. The organic binder can be, for example, polyvinyl pyrrolidone, polyethylene glycol, a vinyl pyrrolidone-vinyl acetate copolymer, or a methyl vinyl ester-maleic anhydride copolymer. The fixing or stabilizing agent can be, for example, 4,5-(2,3-d-fructopyrano)-oxazolidine-2-thione or sodium thiosulfate. After exposure, an image can be developed and stabilized in one step by contacting the element with water.